United States Patent
Katsumata et al.

(10) Patent No.: US 11,603,795 B2
(45) Date of Patent: Mar. 14, 2023

(54) GENERATOR WITH AIR-CYCLE COOLING

(71) Applicant: Hamilton Sundstrand Corporation, Charlotte, NC (US)

(72) Inventors: Shin Katsumata, Rockford, IL (US); Debabrata Pal, Hoffman Estates, IL (US); Kris H. Campbell, Poplar Grove, IL (US); Erika M. Danckers, Rockford, IL (US); Andreas C. Koenig, Rockford, IL (US); Brian C. Konopa, Rockford, IL (US); Jonathan C. Dell, Elgin, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 617 days.

(21) Appl. No.: 16/661,697

(22) Filed: Oct. 23, 2019

(65) Prior Publication Data

US 2021/0123379 A1    Apr. 29, 2021

(51) Int. Cl.

| | |
|---|---|
| *F02C 6/08* | (2006.01) |
| *F25B 9/00* | (2006.01) |
| *H02K 7/18* | (2006.01) |
| *H02K 9/18* | (2006.01) |
| *H02K 9/19* | (2006.01) |
| *F02C 7/12* | (2006.01) |
| *F02C 7/18* | (2006.01) |
| *F01D 15/10* | (2006.01) |

(52) U.S. Cl.
CPC ............... *F02C 6/08* (2013.01); *F01D 15/10* (2013.01); *F02C 7/12* (2013.01); *F02C 7/18* (2013.01); *F25B 9/004* (2013.01); *H02K 7/1823* (2013.01); *H02K 9/18* (2013.01); *H02K 9/19* (2013.01); *F05D 2220/76* (2013.01); *F05D 2260/234* (2013.01)

(58) Field of Classification Search
CPC ...... F02C 6/08; F02C 7/12; F02C 7/18; F05D 2220/76; F05D 2260/234; F25B 9/004; H02K 7/1823; H02K 9/18; H02K 9/19; B64D 13/06; B64D 13/08
See application file for complete search history.

(56) References Cited

U.S. PATENT DOCUMENTS

| | | | | |
|---|---|---|---|---|
| 2,508,397 | A | * | 5/1950 | Kane ......................... H02K 9/10 290/2 |
| 2,893,204 | A | * | 7/1959 | Anderson ............... F02C 7/185 60/39.183 |
| 3,816,751 | A | * | 6/1974 | Jampen .................... H02K 9/00 60/39.181 |

(Continued)

OTHER PUBLICATIONS

European Search Report Application No. EP19215242; dated Jul. 17, 2020; pp. 6.

*Primary Examiner* — Loren C Edwards
(74) *Attorney, Agent, or Firm* — Cantor Colburn LLP

(57) ABSTRACT

A generator cooling assembly is provided and includes a rotor, a generator assembly and an air-cycle machine (ACM). The generator assembly includes a generator housing, a generator housed in the generator housing and a shaft coupled to the rotor to transmit shaft power from the rotor to the generator to drive the generator. The ACM is housed in the generator housing and is receptive of air. The air is cooled by the ACM and output from the ACM to the generator as fully cooled air to cool the generator.

8 Claims, 5 Drawing Sheets

(56) References Cited

U.S. PATENT DOCUMENTS

| | | | |
|---|---|---|---|
| 5,284,012 A * | 2/1994 | Laborie | F02C 7/12 |
| | | | 60/39.08 |
| 6,127,758 A * | 10/2000 | Murry | B64D 41/007 |
| | | | 290/55 |
| 6,796,131 B2 | 9/2004 | Sampson | |
| 7,171,819 B2 | 2/2007 | Lui et al. | |
| 7,624,592 B2 | 12/2009 | Lui et al. | |
| 8,522,572 B2 | 9/2013 | Coffinberry et al. | |
| 8,935,928 B2 | 1/2015 | Mills | |
| 9,534,538 B1 | 1/2017 | Cerny | |
| 9,657,969 B2 | 5/2017 | Vaisman et al. | |
| 9,752,462 B1 | 9/2017 | Fletcher | |
| 9,771,157 B2 | 9/2017 | Gagne et al. | |
| 9,857,104 B2 | 1/2018 | Lemieux et al. | |
| 9,957,051 B2 | 5/2018 | Bruno et al. | |
| 10,059,458 B2 | 8/2018 | Squier | |
| 10,215,095 B2 | 2/2019 | Taguchi et al. | |
| 10,358,221 B2 | 7/2019 | Sautron et al. | |
| 2008/0168796 A1 | 7/2008 | Masoudipour et al. | |
| 2010/0170262 A1 | 7/2010 | Kaslusky et al. | |
| 2014/0079530 A1* | 3/2014 | Ferch | F01D 15/10 |
| | | | 415/1 |
| 2014/0305130 A1* | 10/2014 | Shepard | B64D 41/00 |
| | | | 60/773 |
| 2015/0191254 A1 | 7/2015 | Vaisman | |
| 2016/0362999 A1 | 12/2016 | Ho | |
| 2018/0215475 A1 | 8/2018 | Hurt et al. | |
| 2018/0331599 A1 | 11/2018 | Parlante | |
| 2019/0291877 A1 | 9/2019 | Schwarz et al. | |

* cited by examiner

GENERATOR WITH AIR-CYCLE COOLING

BACKGROUND

The following description relates to generators and, more specifically, to a generator with air-cycle cooling.

In power and electricity generation, a generator is a device that converts motive power (i.e., mechanical energy) into electrical power for use in an external circuit. Sources of mechanical energy include steam turbines, gas turbines, water turbines, internal combustion engines, wind turbines, hand cranks, etc.

In the case of a generator used in concert with a gas turbine engine, it is often necessary to cool the generator during operational conditions so as to avoid thermal damage or degraded performance. This is especially true for high-power output generators that dissipate significantly high amounts of heat. In these high-power output generators, in order to manage the large heat dissipation requirements, heat sinking to a cooler heat sink enables flows of low-temperature coolant to generator components, thus allowing the generator components to operate with acceptable component temperatures. In some cases, it is necessary for the cooling assembly that allows for this heat-sinking to be provided as a compact package.

Cooling a high-power output generator in a compact package is challenging. Some solutions involve the use of a refrigeration cycle in which, for example, an air-cycle machine (ACM) is used to drive the generator. In other solutions, a motor-generator is used to control ACM output but the ACM output is not used to provide for cooling of generator components.

BRIEF DESCRIPTION

According to an aspect of the disclosure, a generator cooling assembly is provided and includes a rotor, a generator assembly and an air-cycle machine (ACM). The generator assembly includes a generator housing, a generator housed in the generator housing and a shaft coupled to the rotor to transmit shaft power from the rotor to the generator to drive the generator. The ACM is housed in the generator housing and is receptive of air. The air is cooled by the ACM and output from the ACM to the generator as fully cooled air to cool the generator In accordance with additional or alternative embodiments, the air includes bleed air.

In accordance with additional or alternative embodiments, the generator cooling assembly further includes a primary heat exchanger and a secondary heat exchanger.

In accordance with additional or alternative embodiments, the ACM includes an ACM compressor, which is receptive of the air via the primary heat exchanger, an ACM turbine, which is receptive of partially cooled air from the ACM compressor via the secondary heat exchanger and an ACM rotor operably disposed between the ACM compressor and the ACM turbine.

In accordance with additional or alternative embodiments, the ACM rotor is independent of the shaft.

In accordance with additional or alternative embodiments, hot air from the generator is fed back to an outlet of the ACM.

In accordance with additional or alternative embodiments, the generator cooling assembly further includes an air/oil heat exchanger operably interposed between the ACM and the generator to cool generator oil using the fully cooled air.

In accordance with additional or alternative embodiments, the generator cooling assembly further includes a permanent magnet motor-generator operably coupled to the ACM to control a temperature of an outlet of the ACM.

According to an aspect of the disclosure, a generator cooling assembly is provided and includes a rotor, a generator assembly and an air-cycle machine (ACM). The generator assembly includes a generator housing, a generator housed in the generator housing and a shaft coupled to the rotor to transmit shaft power from the rotor to the generator to drive the generator. The ACM is housed in the generator housing and operably disposed on the shaft. The ACM is driven by shaft power from the rotor to be receptive of air, which is cooled by the ACM and output to the generator as fully cooled air to cool the generator.

In accordance with additional or alternative embodiments, the air includes bleed air.

In accordance with additional or alternative embodiments, the generator cooling assembly further includes a primary heat exchanger and a secondary heat exchanger.

In accordance with additional or alternative embodiments, the ACM includes an ACM compressor, which is receptive of the air via the primary heat exchanger, an ACM turbine, which is receptive of partially cooled air from the ACM compressor via the secondary heat exchanger and an ACM rotor, which is provided as a component of the shaft, and which is operably disposed between the ACM compressor and the ACM turbine.

In accordance with additional or alternative embodiments, hot air from the generator is fed back to an outlet of the ACM.

In accordance with additional or alternative embodiments, the generator cooling assembly further includes an air/oil heat exchanger operably interposed between the ACM and the generator to cool generator oil using the fully cooled air.

According to an aspect of the disclosure, a generator cooling assembly is provided and includes a rotor, a generator assembly and an air-cycle machine (ACM). The generator assembly includes a generator housing, a generator housed in the generator housing and a first shaft coupled to the rotor to transmit shaft power from the rotor to the generator to drive the generator. The ACM is housed in the generator housing. The ACM is operably disposed on a second shaft coupled to the rotor to transmit the shaft power from the rotor to the ACM to drive the ACM to be receptive of air, which is cooled by the ACM and output to the generator as fully cooled air to cool the generator.

In accordance with additional or alternative embodiments, the air includes bleed air.

In accordance with additional or alternative embodiments, the generator cooling assembly further includes a primary heat exchanger and a secondary heat exchanger.

In accordance with additional or alternative embodiments, the ACM includes an ACM compressor, which is receptive of the air via the primary heat exchanger, an ACM turbine, which is receptive of partially cooled air from the ACM compressor via the secondary heat exchanger and an ACM rotor, which is provided as a component of the second shaft, and which is operably disposed between the ACM compressor and the ACM turbine.

In accordance with additional or alternative embodiments, hot air from the generator is fed back to an outlet of the ACM.

In accordance with additional or alternative embodiments, the generator cooling assembly further includes an air/oil heat exchanger operably interposed between the ACM and the generator to cool generator oil using the fully cooled air.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a compact package for cooling a high-power output electrical generator is provided. The compact package includes an air-cycle machine (ACM) to provide cooling for the high-power output electrical generator and for electronics associated with electric power generation and relies on a gas turbine engine to provide shaft power to drive the high-power output electrical generator.

Figure 1:
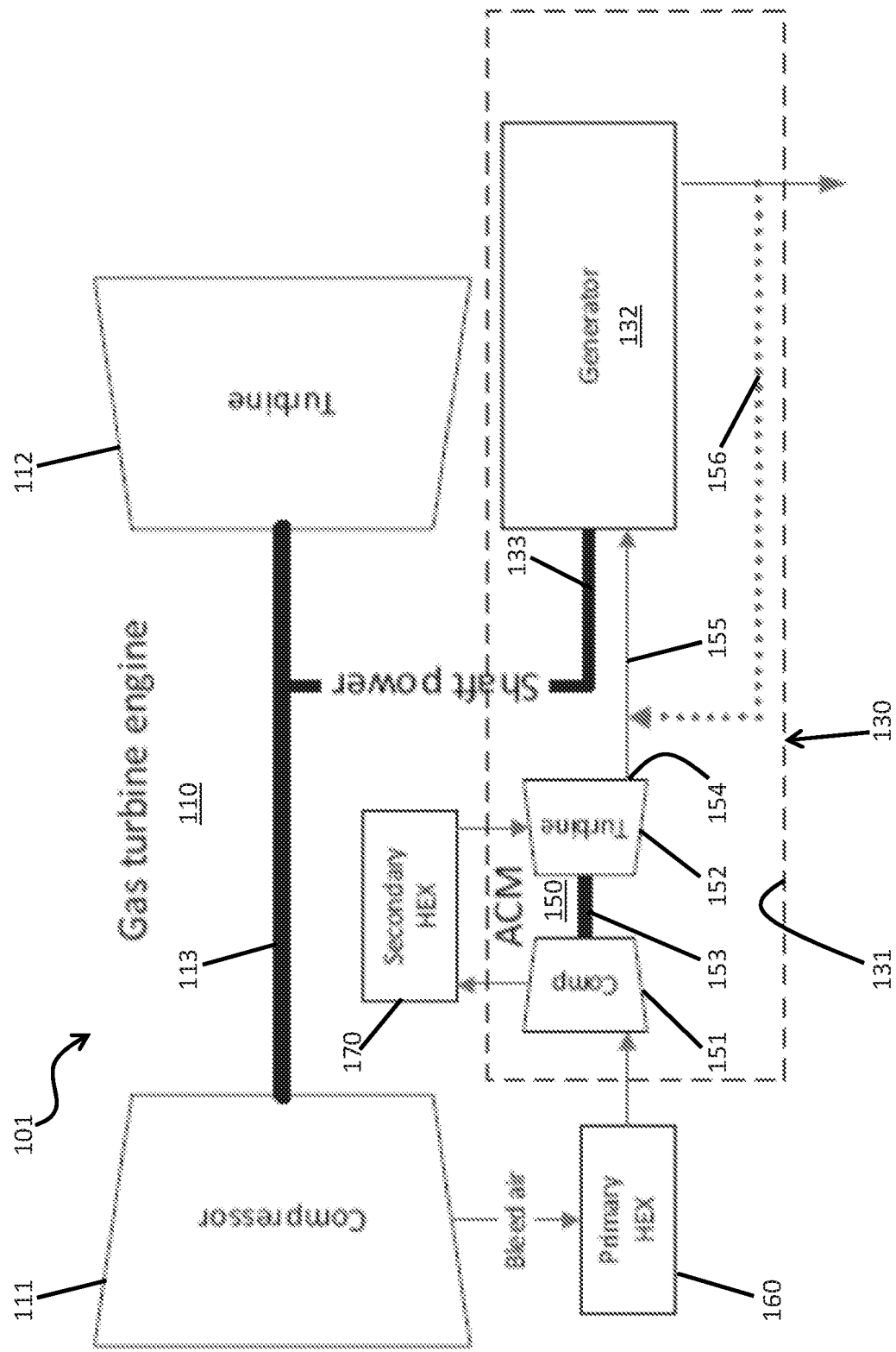
FIG. 1 is a schematic diagram of a generator cooling assembly in accordance with embodiments.

With reference to FIG. 1, a generator cooling assembly 101 is provided. For an exemplary embodiments and in certain applications, the generator cooling assembly 101 includes a gas turbine engine 110, though it is to be understood that this is not necessary (for purposes of clarity and brevity, the following description will relate to the exemplary cases where the generator cooling assembly 101 includes the gas turbine engine 110 as shown in FIG. 1). The gas turbine engine 110 includes a compressor 111, which is configured to compress inlet air, a combustor (not shown) in which the compressed inlet air is mixed with fuel and combusted to generate a high-temperature and high-pressure working fluid, a turbine 112 in which the working fluid is expanded to generate work and a rotor 113. The rotor 113 is operably disposed between the compressor 111 and the turbine 112. During operations of the gas turbine engine 110, the expansion of the working fluid in the turbine 112 causes the rotor 113 to rotate. The rotation of the rotor 113 drives operations of the compressor 111.

The generator cooling assembly 101 further includes a generator assembly 130, an ACM 150, a primary heat exchanger 160 and a secondary heat exchanger 170. The generator assembly 130 includes a generator housing 131, a generator 132 housed in the generator housing 131 and a shaft 133. The shaft 133 is coupled to the rotor 113 of the gas turbine engine 110 to transmit shaft power from the rotor 113 to the generator 132 to drive operations of the generator 132. The ACM 150 is housed in the generator housing 131 and is receptive of air from the compressor 111, which is cooled by the ACM and output to the generator 132 as fully cooled air to cool the generator 132. In accordance with embodiments, the air from the compressor 111 can include bleed air. The primary heat exchanger 160 is operably disposed downstream from the compressor 111 and the secondary heat exchanger 170 is operably coupled to the ACM 150.

In accordance with embodiments in which the generator cooling assembly 101 is provided as a component of an aircraft, the primary heat exchanger 160 and the secondary heat exchanger 170 can be cooled by turbofan air flow or by ram air flow developed by aircraft motion. In addition, ACM rotor 153 (to be described below) can drive ram air to provide a flow of air to cool the primary heat exchanger 160 and the secondary heat exchanger 170 when the aircraft is grounded or operating in low-altitude flights.

As shown in FIG. 1, the ACM 150 includes an ACM compressor 151, an ACM turbine 152 and the ACM rotor 153. The ACM compressor 151 is receptive of the air from the compressor 111 via the primary heat exchanger 160 and configured to compress this air. The ACM turbine 152 is receptive of partially cooled air from the ACM compressor 151 via the secondary heat exchanger 170, which is operably interposed between the ACM compressor 151 and the ACM turbine 152. The ACM turbine 152 is configured to expand the partially cooled air to produce fully cooled air, which can be output to the generator 132 by way of an ACM outlet 154. The ACM rotor 153 is independent of the shaft 133 and is operably disposed between the ACM compressor 151 and the ACM turbine 152. During operations of the ACM 150, the expansion of the partially cooled air in the ACM turbine 152 causes the ACM rotor 153 to rotate and the rotation of the ACM rotor 153 drives operations of the ACM compressor 151.

The fully cooled air produced by the ACM turbine 152 is output to the generator 132 by way of the ACM outlet 154 and first conduit 155. Hot air generated by the generator 132 is either dumped to an exterior or is fed back toward the ACM outlet 154 along second conduit 156 to prevent icing at or near the ACM outlet 154.

Figure 2:
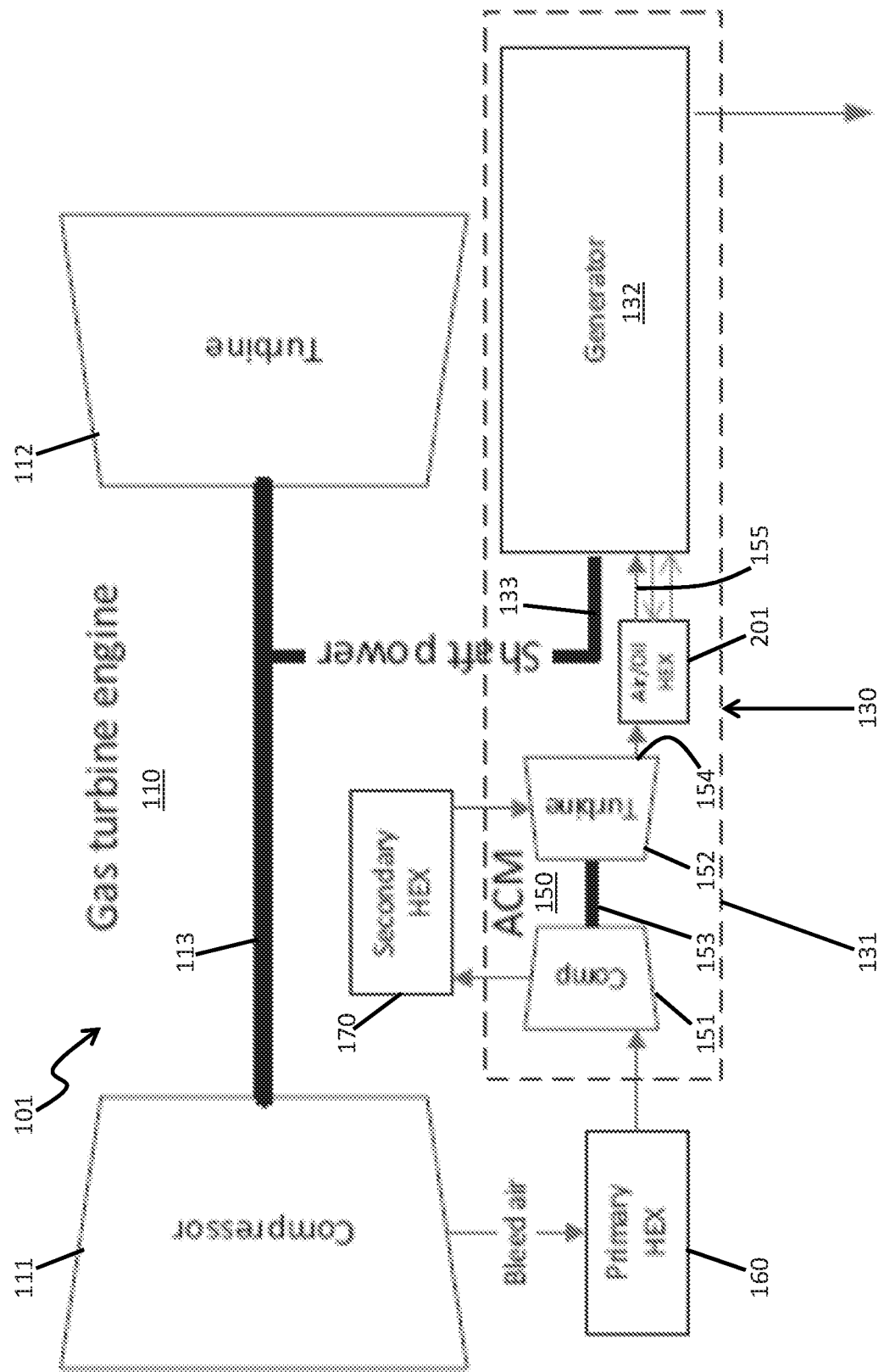
FIG. 2 is a schematic diagram of the generator cooling assembly of FIG. 1 in accordance with further embodiments.
Figure 3:
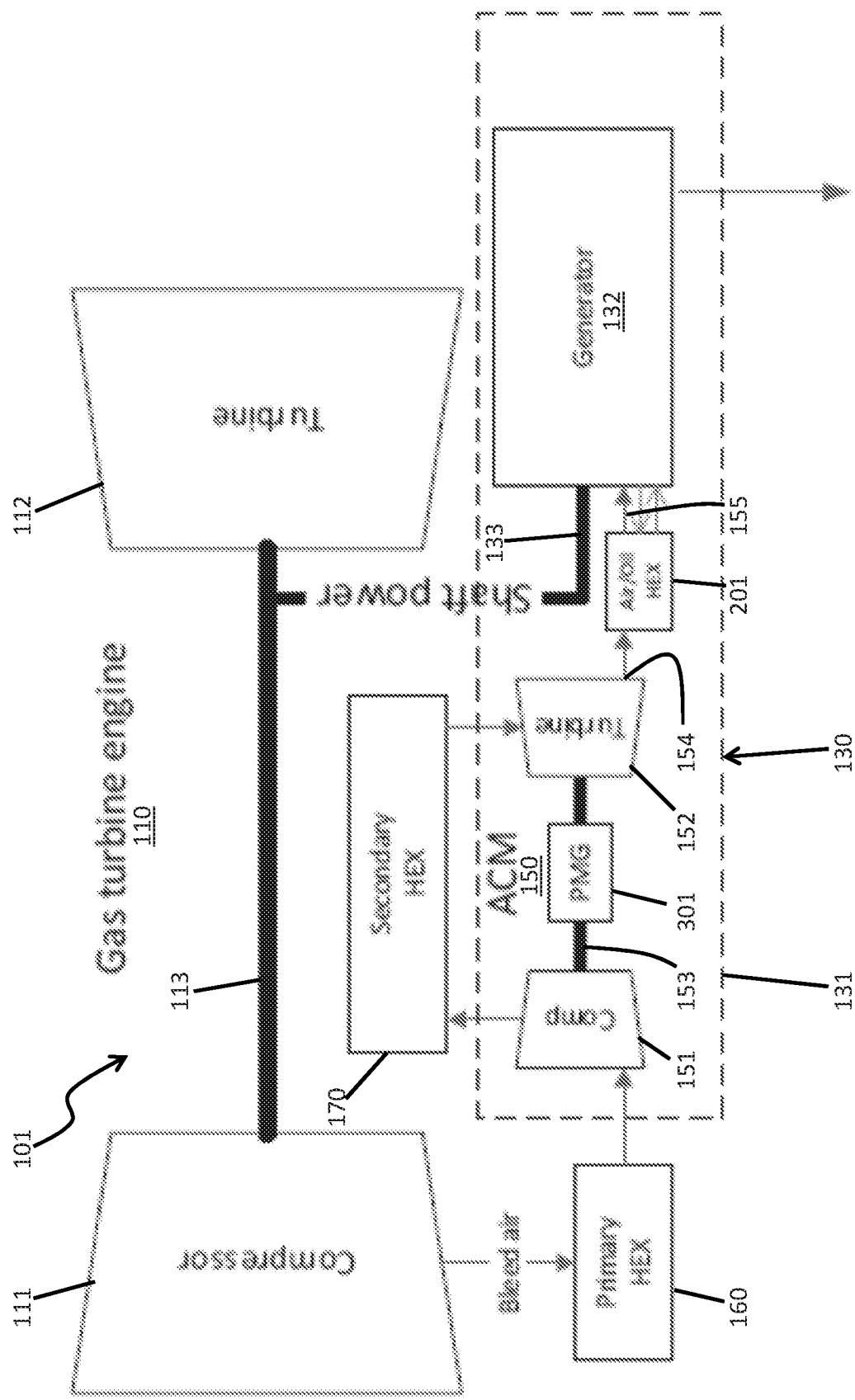
FIG. 3 is a schematic diagram of the generator cooling assembly of FIG. 1 in accordance with further embodiments

With reference to FIGS. 2 and 3 and, in accordance with additional or further embodiments, the generator cooling assembly 101 can also include either or both of an air/oil heat exchanger 201 (see FIG. 2) and a permanent magnet motor-generator 301 (see FIG. 3). As shown in FIG. 2, the air-oil heat exchanger 201 can be operably interposed along the first conduit 155 between the ACM outlet 154 and the generator 132 to cool generator oil using the fully cooled air. As shown in FIG. 3, the permanent magnet motor-generator 301 can be operably coupled to the ACM 150 and disposed on the ACM rotor 153 to control a temperature of the ACM outlet 154. The permanent magnet motor-generator 301 can be operable to extract electrical power from or to provide motoring power to the ACM 150.

It is to be understood that the various embodiments of FIGS. 1, 2 and 3 can all be incorporated into the generator cooling assembly 101 in multiple combinations and permutations beyond those illustrated in FIGS. 1, 2 and 3.

Figure 4:
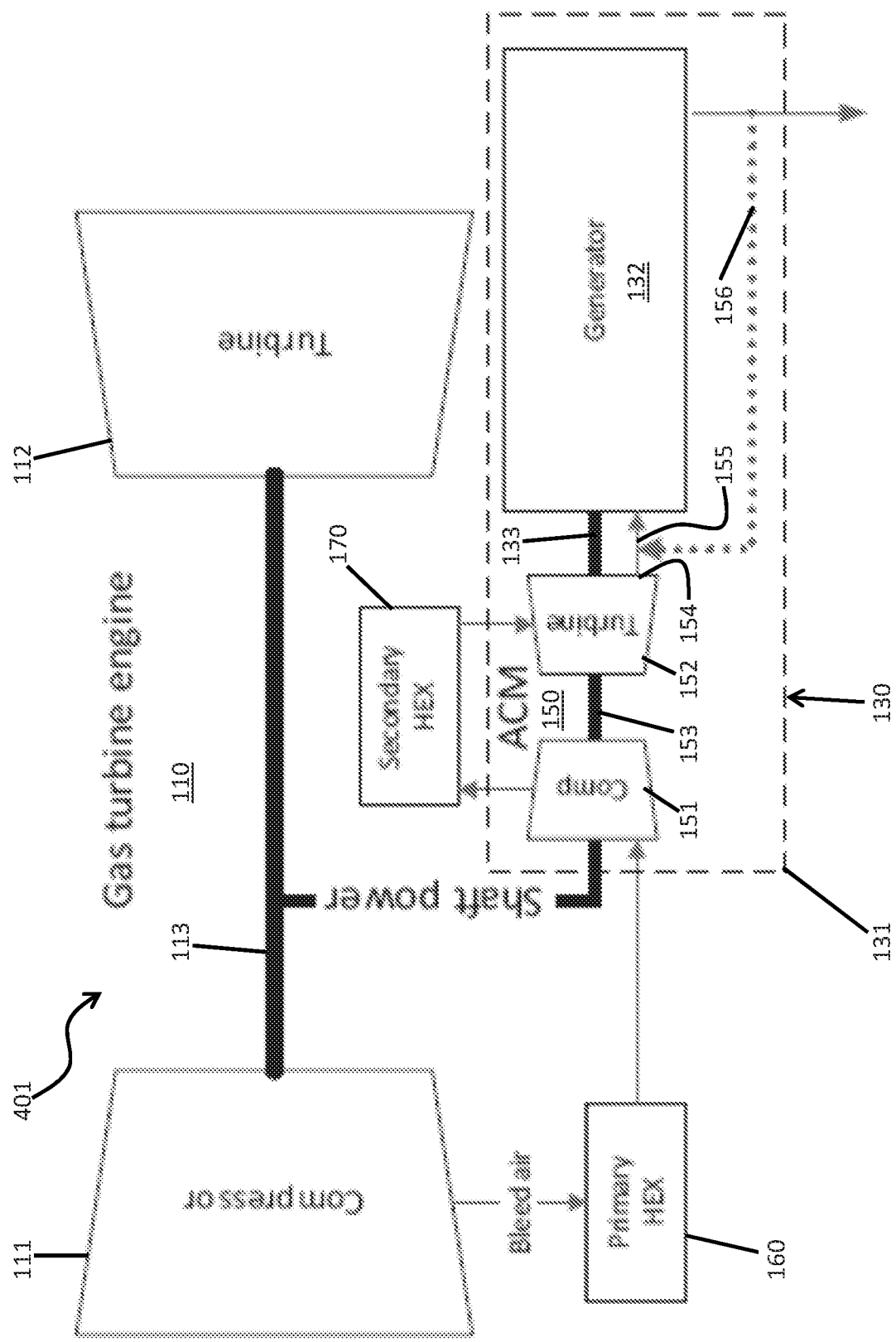
FIG. 4 is a schematic diagram of a generator cooling assembly in accordance with alternative embodiments.

With reference to FIG. 4, a generator cooling assembly 401 is provided. The generator cooling assembly 401 is generally similar to the generator cooling assembly 101 of FIGS. 1, 2 and 3 except that the generator cooling assembly 401 is characterized in that the ACM 150 is operably disposed on the shaft 133 and the ACM rotor 153 is provided as a component of the shaft 133 (in these or other embodiments, the ACM compressor 151, the ACM turbine 152 and the generator 132 can be provided in a power extraction arrangement in an engine gearbox). Other details of the generator cooling assembly 401, which are common with the generator cooling assembly 101, need not be described further. With the configuration of FIG. 4, the ACM 150 of the generator cooling assembly 401 is driven by shaft power from the rotor 113 to be receptive of the air from the compressor 111, which is cooled by the ACM 150 and output to the generator 132 as the fully cooled air to cool the generator 132.

Figure 5:
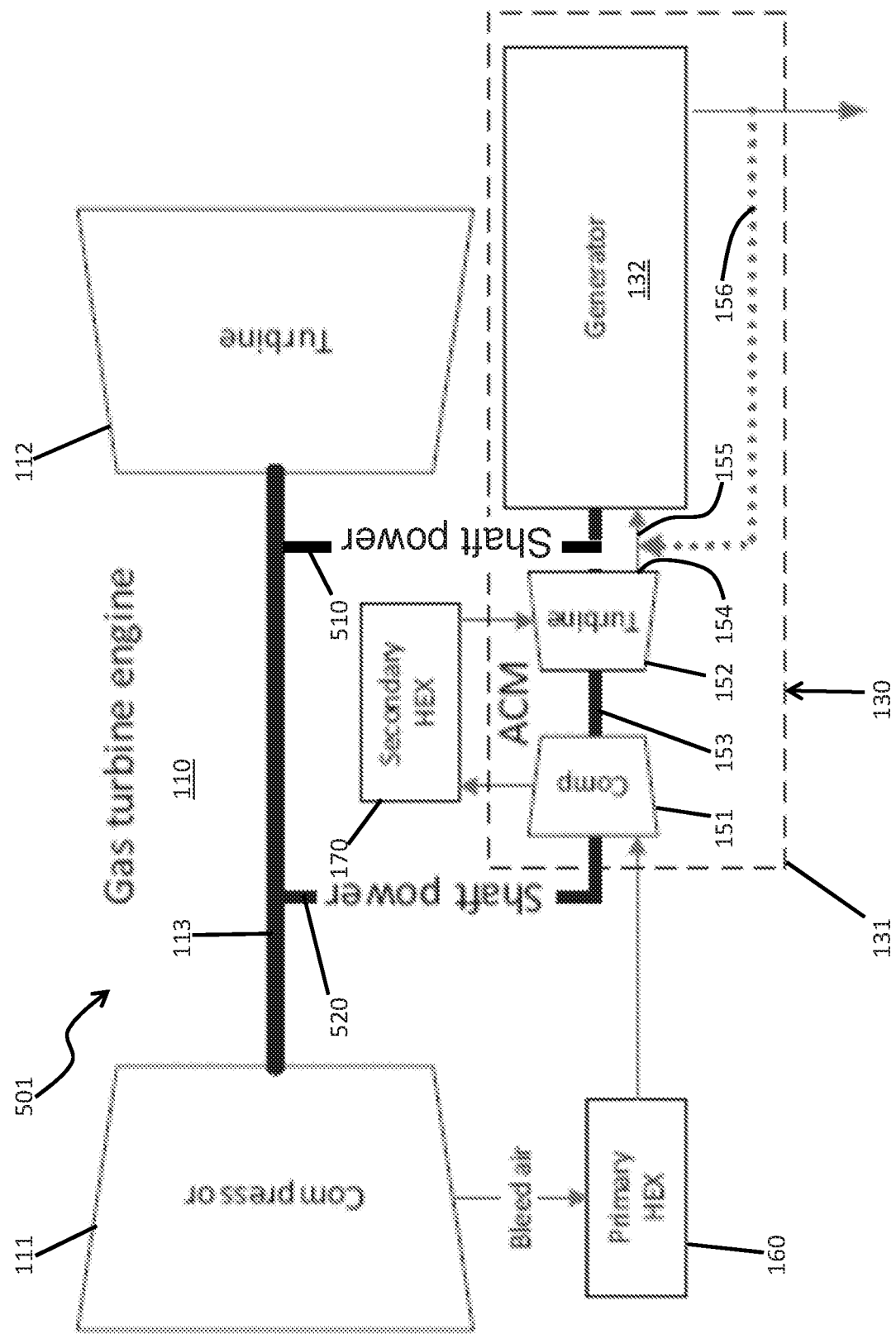
FIG. 5 is a schematic diagram of a generator cooling assembly in accordance with alternative embodiments.

With reference to FIG. 5, a generator cooling assembly 501 is provided. The generator cooling assembly 501 is generally similar to the generator cooling assembly 101 of FIGS. 1, 2 and 3 and the generator cooling assembly 401 of FIG. 4 except that the generator cooling assembly 501 is characterized in that generator assembly 130 includes a first shaft 510, which is coupled to the rotor 113 to transmit shaft power from the rotor 113 to the generator 132 to drive the generator 132, and that the ACM 150 is operably disposed on a second shaft 520. The second shaft 520 is coupled to the rotor 113 to transmit the shaft power from the rotor 113 to the ACM 150 to drive the ACM 150 to be receptive of the air from the compressor 111. Here, the ACM rotor 153 is provided as a component of the second shaft 520. Other details of the generator cooling assembly 501, which are common with the generator cooling assembly 101 of FIGS. 1, 2 and 3 and with the generator cooling assembly 401 of FIG. 4 need not be described further. With the configuration of FIG. 5, the ACM 150 of the generator cooling assembly 501 is driven by shaft power from the rotor 113 to be receptive of the air from the compressor 111, which is cooled by the ACM 150 and output to the generator 132 as the fully cooled air to cool the generator 132.

It is to be understood that the multiple combinations and permutations of the various embodiments of FIGS. 1, 2 and 3 can all be incorporated into the generator cooling assembly 401 of FIG. 4 and the generator cooling assembly 501 of FIG. 5 in further multiple combinations and permutations beyond those illustrated in FIGS. 4 and 5. For example, at least the embodiments of FIGS. 4 and 5 can be modified to include the air/oil heat exchanger 201 of FIG. 2 or to include the air/oil heat exchanger 201 of FIG. 2 with an additional provision of an oil-cooled generator.

Technical effects and benefits of the present disclosure are the provision of a compact package for cooling a high-power output electrical generator that will allow the high-power output electrical generator to operate at relatively cool temperatures as compared to what would be possible with traditional cooling systems and methods.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A generator cooling assembly, comprising:
    a rotor;
    a generator assembly comprising a generator housing, a generator housed in the generator housing and a shaft coupled to the rotor to transmit shaft power from the rotor to the generator to drive the generator; and
    an air-cycle machine (ACM) housed in the generator housing and comprising an ACM rotor operably disposed between an ACM compressor and an ACM turbine,
    the ACM rotor being rotatable by expansion of partially cooled air in the ACM turbine and rotatable independent of the shaft, and
    the ACM being receptive of first air, the first air being cooled by the ACM and output to the generator as a fully cooled air to cool the generator.

2. The generator cooling assembly according to claim 1, wherein the first air comprises bleed air.

3. The generator cooling assembly according to claim 1, further comprising a primary heat exchanger and a secondary heat exchanger.

4. The generator cooling assembly according to claim 3, wherein the ACM comprises:
    the ACM compressor, the ACM compressor being receptive of the first air via the primary heat exchanger; and
    the ACM turbine, the ACM turbine being receptive of the partially cooled air from the ACM compressor via the secondary heat exchanger.

5. The generator cooling assembly according to claim 4, wherein rotation of the ACM rotor is independent of rotation of the shaft.

6. The generator cooling assembly according to claim 1, wherein hot air from the generator is fed back to an outlet of the ACM.

7. The generator cooling assembly according to claim 1, further comprising an air/oil heat exchanger operably interposed between the ACM and the generator to cool generator oil using the fully cooled air.

8. The generator cooling assembly according to claim 1, further comprising a permanent magnet motor-generator operably coupled to the ACM to control a temperature of an outlet of the ACM.

\* \* \* \* \*